Sept. 22, 1970 KARL-OTTO KNABE 3,530,338

ELECTRONIC SWITCHING CIRCUIT

Filed Sept. 22, 1967 2 Sheets-Sheet 1

Sept. 22, 1970 KARL-OTTO KNABE 3,530,338

ELECTRONIC SWITCHING CIRCUIT

Filed Sept. 22, 1967 2 Sheets-Sheet 2

United States Patent Office 3,530,338

Patented Sept. 22, 1970

3,530,338

ELECTRONIC SWITCHING CIRCUIT

Karl-Otto Knabe, Ortlerstrasse 1,
Munich 25, Germany

Filed Sept. 22, 1967, Ser. No. 669,893
Claims priority, application Germany, Sept. 23, 1966, S 106,067
Int. Cl. H02h 7/00; H02j 3/10
U.S. Cl. 317—33 2 Claims

ABSTRACT OF THE DISCLOSURE

A safety circuit to prevent damage to a low resistance switching device, responsive to overload conditions existing in an associated load circuit to cause said switching device to disconnect the load circuit from its power supply. The switching device may comprise a transistor switch, which in its conducting state, connects the power supply through to the load circuit. The safety circuit comprises a semiconductor element that is activated in response to overload conditions in the load circuit, to drive the transistor switch to the non-conducting state and thereby disconnect the power supply from the load circuit. The transistor switch is coupled to the output circuit of an oscilaltor, and driving the transistor switch to the non-conducting state does not inactivate the oscillator, because the activated semiconductor element is substituted for the transistor switch in the oscillator output circuit. If the overload condition is corrected, the transistor switch is automatically recoupled to the oscillator output circuit and is again driven to the conducting state thereby to complete the connection between the power supply and the load circuit, and the semiconductor element is inactivated.

CROSS REFERENCE TO RELATED APPLICATION

Applicant claims priority from the corresponding German application Ser. No. S. 106,067, filed Sept. 23, 1966.

BACKGROUND OF THE INVENTION

Field of the invention

The invention relates to a safety device to disconnect a power supply from a load circuit when overload conditions resulting for example from a short circuit in the load circuit, occur. The invention has particular utility in key type modulators wherein a particular output signal is produced in response to the polarity of the input signal, and employs a transistor switch to disconnect the power suply from the load circuit, and an associated semiconductor safety device to prevent damage to the transistor switch.

State of the prior art

The prior art teaches the utilization of low resistance electronic switches to connect a power supply to a load circuit. Such low resistance electronic switches may be damaged, however, if the load circuit is overloaded. Overload conditions may result from a short circuit in the load circuit, or the application of external voltages to the load circuit, for example. Under these conditions, the low resistance electronic switch may be damaged by excessive current flow.

Some prior art circuits therefore provide for the use of a fuse, that is operative in response to a predetermined temperature or current to disconnect the load circuit from the power supply. However, when the condition causing overload is removed, the fuse is not able to reinitiate connection of the power supply to the load circuit. Other prior art devices therefore utilize mechanical relays to disconnect the load circuit from the power supply when overload conditions occur, which are responsive to a return to normal load conditions, to again connect the power supply to the load circuit. However, such relays normally have a long response time, and are therefore incompatible with modern electronic circuits.

It is also known that resistors or safety lamps may be used to limit the curent flowing to a load circuit from the power supply. However, these normally have relatively high resistances and therefore consume a relatively large amount of power thereby reducing the efficiency of the circuit. Further, such protective elements normally produce a relatively great amount of heat that must be dissipated.

SUMMARY OF THE INVENTION

These and other defects of prior art circuits are solved by the present invention which employs an electronic safety device operative in response to excessive load currents to disconnect the power supply from the load circuit. Further, the safety device automatically reconnects the power supply to the load circuit, when the overload conditions causing excessive load currents are removed. Such overload conditions may result from short circuiting a portion or all of the load circuit, or applying an external voltage to the load circuit, or the like.

In one embodiment of this invention, a transistor switch is driven to the conducting state wherein it connects a selected power supply through to the load circuit, in response to activation of an oscillator by a particular input signal. The electronic safety device employs a thyristor having a gate connected in the load circuit. Thus, excessive load currents cause the gate energy to exceed the gate threshold energy, and thereby fire the thyristor to conduction.

The oscillator output circuit is inductively coupled to the transistor switch and the thyristor through an output transformer. When the thyristor is fired to conduction, it loads the oscillator such that the signal coupled from the oscillator to the transistor switch through the output transformer is insufficient to maintain conduction of the transistor switch. Therefore, the transistor switch is driven to the non-conducting state and the power supply is disconnected from the load circuit; however, the oscillator remains operative. Additional circuit means are employed to drive the thyristor to the non-conducting state when the oscillator is inactivated, and as a result the thyristor no longer loads down the oscillator output transformer. The transistor switch is then again driven to the conducting state by the oscillator, and the connection between the power supply and the load circuit is automatically reinitiated, if the oscillator is reactivated and the overload conditions are corrected.

The described safety device is particularly applicable to a key type modulator, the output of which is responsive to the polarity of the input signal. Depending upon the polarity of the input signal, a selected one of two oscillators is activated to drive an associated transistor switch to complete the connection of the desired power supply to the load circuit and thereby effect the desired modulator output signal. When the polarity of the input signal applied to the modulator reverses, the other of the two oscillators is correspondingly activated, and the modulator output signal changes. The safety device must therefore be responsive to overload conditions in the load circuit and must also maintain activation of its associated oscillator, so that the load circuit can again be automatically connected to the desired power suply when the overload conditions are removed, if a change in modulator input signal polarity has not occurred. Another embodiment of the invention employs transistors in lieu of thyristors in the safety device to effect the desired objects discussed above.

Therefore the invention provides quick disconnection of a load circuit from a power supply when overload conditions are present, and automatic reconnection when said conditions are removed. Further, with respect to the modulator circuit disclosed, the safety device may ready the circuit to immediately reconnect the power supply to the load circuit when the overload conditions are removed, by maintaining activation of the associated oscillator when its normal output circuit is disconnected, by substituting another circuit therefor.

DETAILED DESCRIPTION OF THE INVENTION

Figure 1:
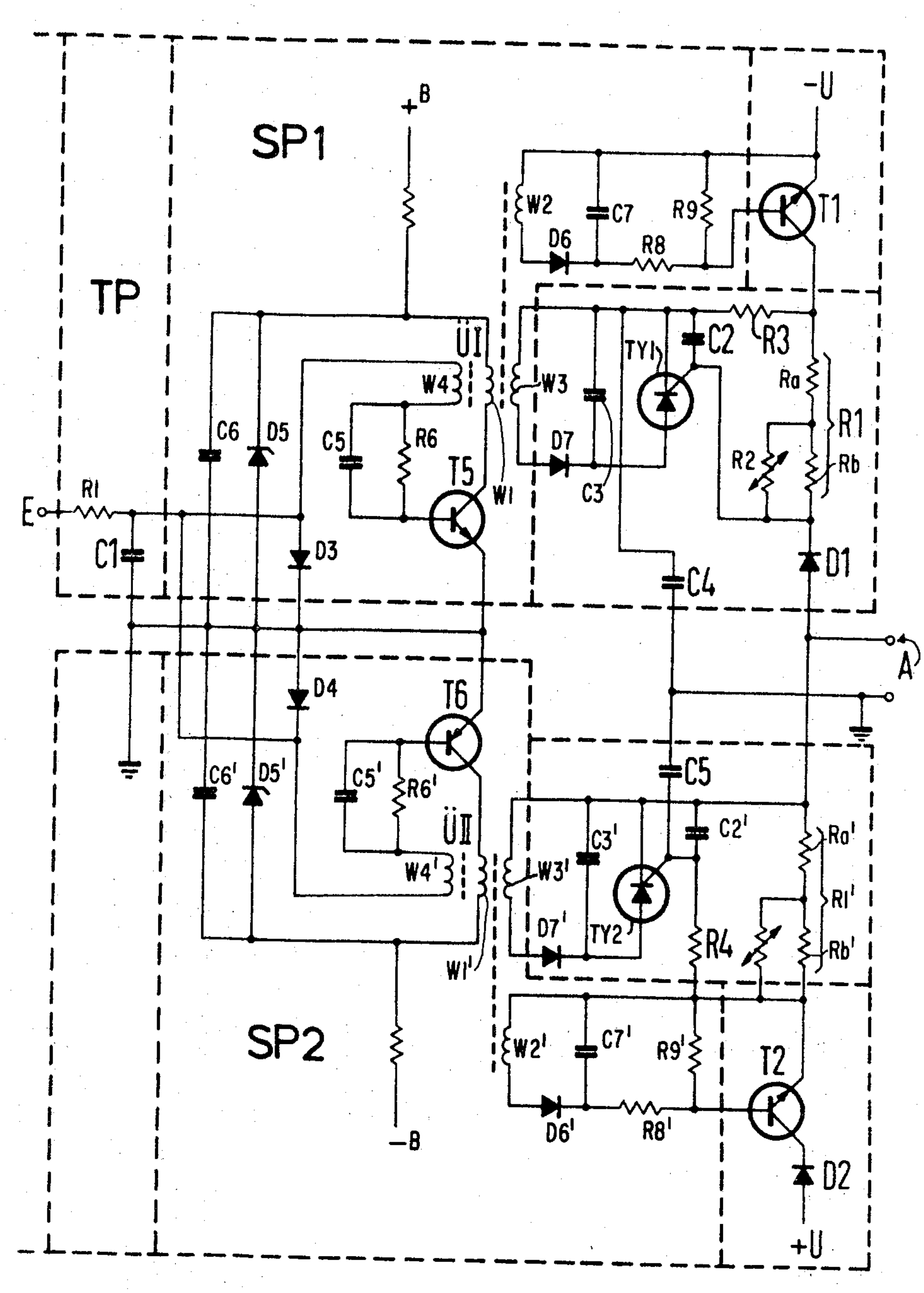
FIG. 1 is an electrical schematic diagram of one embodiment of the invention wherein the safety device circuit comprises controlled rectifiers.

FIG. 1 shows an electronic key type modulator circuit wherein input signals are applied between input terminal E and ground. Resistor R1 and capacitor C1 are connected between terminal E and ground, and comprise a low pass filter designated TP. The common connection of resistor R1 and capacitor C1 is connected to the anode of diode D3 and the cathode of diode D4. The cathode of diode D3 and the anode of diode D4 are connected to ground.

Blocking oscillators SP1 and SP2 comprise transistors T5 and T6, one of which is selectively operative to produce alternating current output signals at a particular time, depending upon the polarity of the signals applied to the input of the modulator circuit. Transistor T5 comprises an NPN transistor connected in grounded emitter configuration, and transistor T5 comprises a PNP transistor connected in grounded emitter configuration.

When a positive polarity signal is applied to input E of the modulator circuit, it will be shunted to ground through diode D3. This clamps the base of transistor T5 to ground, and initiates conduction of transistor T5. Winding W1 of output transformer UI is connected between the positive source of potential +B and the collector of transistor T5. Its inherent capacitance, in combination with its inductance (and possible other capacitors connected thereto, if desired), determines the resonant frequency of the alternating current signals produced by oscillator SP1. Winding W4 is inductively coupled to winding W1, and couples a portion of the alternating current output signals from transistor T5 back to the input (between the base and emitter) in regenerative feedback manner to maintain the oscillations. The parallel connection of resistor R6 and capacitor C5 in series connection with the base of transistor T5 provides a biasing circuit to enable the oscillations to build up. The parallel connection of diode D5 and capacitor C6 is connected between the collector and emitter of transistor T5, in series with winding W1, the common connection between the parallel connection (C6 and D5) and winding W1 being connected to +B through resistor R7. Diode D5 protects transistor T5 from inductive kickback from output transformer UI, and prevents damage to transistor T5 that might result from conduction thereof in its reverse direction. Capacitor C6 stabilizes the voltage between the emitter and collector of diode D5.

When a positive input signal is applied between input terminal E and ground, it is also applied between the base and emitter of transistor T6, to bias it to the non-conducting state. Thus, diode D4 is poled to block a positive input signal and thereby causes it to be applied to the base of transistor T6 to prevent conduction thereof, whereas diode D3 is poled to shunt a positive input potential to ground and thereby clamps the base of transistor T5 to ground and initiates conduction thereof.

Similarly, when a negative input signal is applied to the input circuit between terminal E and ground, diode D4 is poled to shunt said negative input to ground, and thereby clamps the base of transistor T6 to ground, thereby initiating conduction of transistor T6 of oscillator SP2. Diode D3 is poled to block negative signals, and therefore said negative signals are applied to the base of transistor T5 biasing said transistor to the non-conducting state.

The regenerative feedback circuit employed by oscillator SP2 to maintain oscillations is similar to that described in relation to transistor T5, and comprises output transformer UII, having primary winding W1′ connected in the collector circuit of transistor T6. Primary winding W1′ inductively couples a portion of its output to feedback winding W2′, to maintain the oscillations produced by transistor T6. Resistor R6′ and capacitor C5′ are connected in parallel in series connection between the base of transistor T6 and feedback winding W4′, to enable the oscillations to build up when a negative polarity input signal is applied to the modulator input. Diode D5′ and capacitor C6′ are connected in parallel between feedback winding W2′ and ground and functions similarly to the described operation of diode D5 and capacitor C6.

It is therefore seen that only one of oscillators SP1 and SP2 will oscillate, depending upon the polarity of the modulator input signal. The frequencies of the alternating current signals produced by oscillators SP1 and SP2 are determined by their resonant circuit parameters.

Assuming that a positive input signal is applied to the modulator input terminals, oscillator SP1 will be activated to the oscillating state, and will produce a corresponding alternating current output signal in primary winding W1 that is inductively coupled to secondary windings W3 and W4 of its output transformer UI. Diode D6 and capacitor C7 are connected between the ends of winding W2, and diode D6 is poled such that capacitor C7 is charged during one polarity portion of a complete cycle (either the positive or negative portion, depending upon the way windings W1 and W2 are wound with respect to each other) of the alternating current signal coupled to winding W2 through output transformer UI as illustrated, and prevents a negative polarity signal from being applied to the base of transistor T1. It therefore functions to bias the base-emitter thereof in the forward direction. During the opposite polarity portion of the cycle, capacitor C7 will discharge through the path comprising resistors R8 and R9, and the signal applied between the base and emitter of transistor T1 will vary depending upon the relative parameters and time constants of the described charge and discharge paths. The negative source of potential (−U) will be connected through transistor T1 to terminal A of the modulator output when transistor T1 is driven to the conducting state in response to a positive potential applied between its base and emitter. The particular waveform of the signal applied to the load circuit connected between modulator output terminals A and ground in response to conduction of transistor T1, will depend upon the input signal applied between the base and emitter of transistor T1. Thus a pulse type signal output will be applied to the modulator output terminals. Transistor T1 functions as a switch and applies negative pulses produced thereby to the modulator output terminals when it is driven to the conducting state in response to activation of oscillator SP1 resulting from the application of a positive input signal to the modulator. The shape of the negative pulses applied to the modulator output terminals is determined by the base-emitter circuit components of transistor T1, and the particular oscillator frequency employed.

The direct current power supply source U comprises a negative output terminal (−U), a positive output terminal (+U), and a grounded center tap to complete the connections described, and shown in FIG. 1. Low pass filter TP previously described also produces a predetermined time delay between inactivation of one of oscillators SP1 and SP2 and activation of the other in response to a change in polarity of modulator input signals. This prevents simultaneous operation of oscillators SP1 and SP2, which could short circuit power supply source U and connect both −U and +U through to the load circuit.

The collector circuit of transistor T1 comprises the series connection of resistor device R1 and diode D1 connected between output terminal A and the collector of transistor T1. Resistor device R1 comprises the series connection of resistors R*a* and R*b*, the resistance of resistors R*a* and R*b* being relatively low (approximately equal to one or two ohms). The total resistance of resistor device R1 may be varied by variable resistor R2.

The cathode of diode D1 is connected to one end of resistor device R1, and to the gate of thyristor TY1. The anode of diode D1 is connected to output terminal A, and its function will be explained hereinafter. A series connection comprising capacitor C2, diode D1, and the load circuit is therefore connected between the cathode of thyristor TY1 and ground. Further, capacitor C4 is connected in parallel with the described series connection between the cathode of thyristor TY1 and ground. Capacitor C2 is connected between the gate and cathode of thyristor TY1. Therefore, capacitors C4 and C2 comprise a voltage divider network, and their relative capacitance values determine the gate energy applied to the gate of thyristor TY1.

Under normal load circuit conditions, the current output of transistor T1 is fed through resistor device R1 to the load circuit and produces a corresponding voltage drop across resistor device R1 to bias the gate of thyristor TY1 to a positive potential that is not sufficient to fire it. However, if a short circuit occurs in the load circuit when oscillator SP1 is operative and transistor switch T1 is therefore in the conducting state, the gate of thyristor TY1 will be driven more positive with respect to its cathode as compared to normal load conditions, because the current flow through the parallel path comprising the series connection of capacitor C2, diode D1, and the short circuited load will increase the positive potential at the gate of thyristor TY1 while the negative potential at the cathode of thyristor TY1 will tend to be maintained by capacitor C4. The increase in positive potential of the gate of thyristor TY1 relative to its cathode under these conditions, is sufficient to fire thyristor TY1 to conduction, if the load current exceeds a predetermined amplitude. Variable resistor R2 may vary or select said predetermined amplitude value because it affects the relative potential across capacitor C2.

Further the anode of thyristor TY1 is positive with respect to its cathode when oscillator SP1 is operative because secondary winding W3 is inductively coupled to primary winding W1 of output transformer UI as shown. The series connection of diode D7 and capacitor C3 is connected between the ends of winding W3. The anode and cathode of thyristor TY1 are connected across capacitor C3, and diode D7 is poled to charge capacitor C3 as illustrated in FIG. 1 during one polarity portion of a complete cycle of the alternating current signal produced at winding W1 by oscillator SP1 during which winding W3 is inductively coupled to winding W3. The other polarity portion of the cycle is blocked from being induced in winding W3 by diode D7. Therefore, the anode of thyristor TY1 is maintained positive with respect to its cathode when oscillator SP1 is operative and thyristor TY1 is thereby forward biased so that it may conduct when its gate threshold energy is exceeded in response to a short circuit in the load.

Then, if in response to a shirt circuit in the load circuit, the increased positive potential signal present at the gate of thyristor TY1 relative to its cathode, is such that the gate threshold energy of TY1 is exceeded, it will be fired to conduction and capacitor C3 will discharge through the low resistance discharge path provided by the thyristor when it is conducting. The resistance across winding W3 will thereby decrease, relative to the resistance when thyristor TY1 is not conducting. This will effectively attenuate the amplitude of the alternating current singals produced in winding W1 that is inductively coupled to winding W2, and the corresponding positive direct current bias applied to the base of transistor T1 will decrease and bias transistor switch T1 to the non-conducting state. Therefore, the load circuit is disconnected from its power supply (output of transistor T1).

If it is assumed that a change in polarity of the input signal to the modulator occurs substantially simultaneously as a short circuit in the load circuit connected to the modulator output, thyristor TY1 will not be fired to conduction. This is because when a short circuit occurs in the load circuit, output terminal A will effectively be connected to ground while the amplitude of the output voltage of transistor T1 is decreasing in response to the change of polarity of the modulator input signal. Under these conditions, there will not be a sufficient increase in current through the parallel path comprising the series connection of capacitor C2, diode D1, and the short-circuited load circuit connected between the cathode of thyristor TY1 and ground, to drive the gate of thyristor TY1 sufficiently positive to fire it. That is, capacitor C4 will tend to maintain the cathode of thyristor TY1 at the potential corresponding to its negative charge, and therefore the voltage dividing network comprising capacitors C2 and C4 will function to bias the gate of thyristor TY1, relative to its cathode, at a potential below the gate threshold energy. Therefore, thyristor TY1 will not be fired to conduction, when modulator load short circuit conditions occur substantially simultaneously with respect to a change in polarity of modulator input signals.

However, the described circuit is still operative to prevent damage to transistor T1 because during a polarity change in the modulator input signal, the current output of transistor T1 decreases to a value such that even if a short circuit occurs in the modulator output load circuit, the current flow is insufficient to damage transistor T1. Therefore, if a short circuit occurs in the load circuit when the input signal to the modulator is not undergoing a change in polarity, or if external voltages are applied to the load circuit and cause excessive current flow in resistor device R1 that exceed a predetermined amount, the gate threshold energy of thyristor TY1 will be exceeded, and it will fire the thyristor.

Thyristor TY1 continues to block conduction of transistor T1 and break the load circuit connection, until oscillator SP1 terminates conduction in response to a change in polarity in the modulator input signal, at which time thyristor TY1 is driven to the non-conducting state because the source of forward direction voltage across its anode-cathode is then removed. Further as it is known, termination of the firing signal applied to the gate of a thyristor does not drive it to the non-conducting state. Therefore, under the conditions described wherein the load circuit connection is broken, and the firing voltage is removed from the gate of thyristor TY1, it will be maintained in the conductive state and will be connected in the load circuit of oscillator SP1, until oscillator SP1 is driven to the non-conducting state by a change in polarity in the modulator input signal.

Then, application of a positive input signal to the modulator, again initiates activation of oscillator SP1 which switches transistor T1 to the conducting state for a short period of time, if the short circuit still exists in the load circuit. Thus, transistor T1 will be driven to the conducting state only for the period of time until the signal applied to the gate of thyristor TY1 increases sufficiently to again fire thyristor TY1 and, as described above, drive transistor T1 to the non-conducting state. The invention contemplates that under the described conditions, wherein reactivation of oscillator SP1 occurs while a short circuit exists in the modulator load circuit, transistor T1 will conduct for a period of time of approximately 20 microseconds. This time period is so slight, that the short circuit condition existing does not cause transistor T1 to conduct excessively such as to cause overheating and possible damage thereto.

Additional elements are provided to prevent erroneous firing of thyristor TY1 in the event that a capacitive load is connected to load output terminal A, which maximizes the time duration of the pulses applied thereto by the modulator output and may therefore erroneously fire thyristor TY1. Thus, the combination of resistor R3 and capacitor C2 functions to time delay the corresponding signals applied to the gate of thyristor TY1. However, in a given pulse cycle, the gate threshold energy of thyristor TY1 may not be reached before transistor switch T1 is damaged, if the capacitive load circuit is short circuited, and the time delay is too long. Thus, in the case of some capacitive loads (as, for example, a long cable), the load circuit current pulses are relatively long and if the time delay introduced by the delay circuit comprising resistor R3 and capacitor C2 is made overly long, transistor switch T1 might be damaged if a load short circuit does occur, because thyristor TY1 will not fire to effect non-conduction of transistor switch T1 until after the delay time has elapsed. Therefore, the relative resistance and capacitance values of resistor R3 and capacitor C2, respectively, are selected to introduce a short time delay to partially compensate for capacitive loads, and the trigger circuit of thyristor TY1 principally is responsive to a short circuit in the modulator load circuit.

If a negative input signal is applied to input circuit E, oscillator SP1 will no longer oscillate, and oscillator SP2 will be driven into oscillation, as described above. Under these conditions thyristor TY1 will not fire. Further, when oscillator SP1 is inactivated, transistor T1 is driven to the non-conducting state and its output is no longer connected to the load circuit.

Diode D1 is connected as described above and shown in FIG. 1 between the modulator output terminal A and the collector of transistor T1. Diode D1 is poled to prevent conduction of transistor T1 in the reverse direction, that might result in response to disturbance voltages present in the load circuit between modulator output terminal A and ground. Thus, diode D1 prevents the collector of transistor T1 from being driven more negative than its emitter in response to said disturbance voltages.

A similar safety device is used in conjunction with oscillator SP2. There, transistor T2 is connected between the positive potential terminal (+U) of voltage source U and the modulator output terminals. When oscillator SP2 is activated in response to a negative polarity input signal, transistor switch T2 applies positive pulses to the modulator output. The gate of thyristor TY2 is responsive to the load circuit current, and if it exceeds the gate threshold energy, thyristor TY2 is fired to effect non-conduction of transistor T2. The biasing circuit for the gate of thyristor TY1 employs capacitors C2′ and C5, which function similarly to capacitors C2 and C4, with corresponding modifications being made in the circuit because of the fact that transistor switch T2 applies positive pulses to the modulator output when oscillator SP2 is activated.

It is seen that the safety device comprising thyristor TY1 is isolated from the transistor switch T1 by winding W3 and may be inserted at any point in the load circuit. Further the use of an electronic safety device (comprising a thyristor or a transistor) is particularly advantageous because it can effect disconnection of the transistor switch in less than approximately 50 microseconds. Thyristors TY1 and TY2 may comprise silicon controlled rectifiers (SCR).

Figure 2:
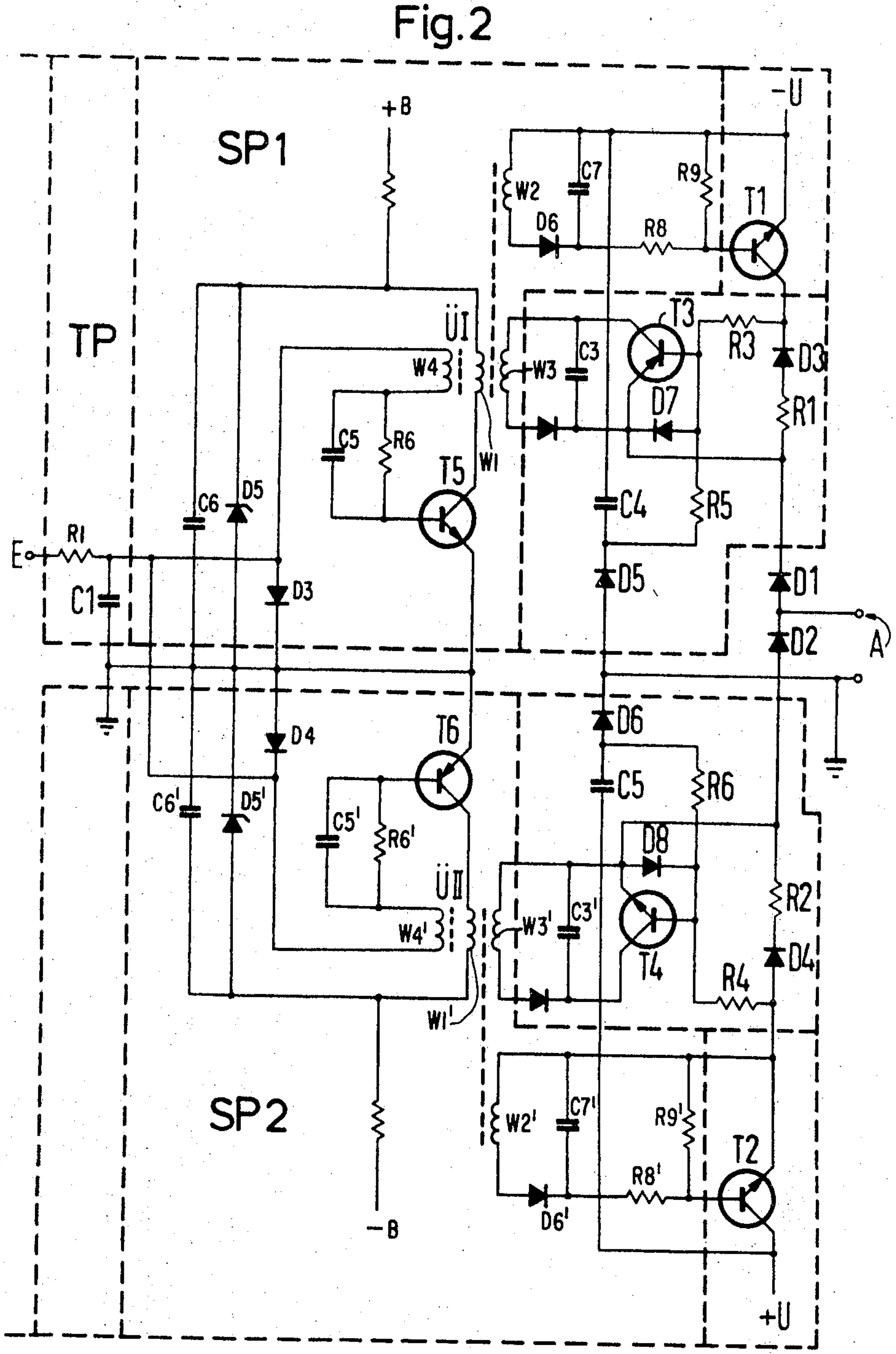
FIG. 2 is an electrical schematic diagram showing another embodiment of the invention wherein the safety device comprises transistors.

FIG. 2 illustrates a configuration substantially similar to the circuit illustrated in FIG. 1, which comprises oscillators SP1 and SP2 that are responsive to positive and negative polarity input signals, to be driven to the oscillating state. Corresponding output signals are produced between modulator output terminals A and ground, through transistor switches T1 and T2 that are driven to conduction in response to activation of oscillators SP1 and SP2, respectively. However, transistors are utilized rather than thyristors in the safety circuit illustrated in FIG. 2.

Thus, with reference to FIG. 2, transistors T3 and T4 are substituted for thyristors TY1 and TY2, respectively, to effect changes in load circuit current in response to overload conditions therein. However, transistors T3 and T4 may selectively vary the load circuit current within a predetermined range in response to the particular overload conditions and do not drive transistor switches T1 and T2 to complete non-conduction (corresponding to zero (0) load current).

Assuming that a positive polarity input signal is applied to the modulator, oscillator SP1 is driven to the oscillating state, to control transistor switch T1 to the conducting state, wherein negative pulses are applied to the modulator output terminals, depending upon the frequency of the alternating current signals produced by oscillator SP1, and the bias circuit components of transistor T1. The series connection of diode D3, resistor T1, and diode D1, is connected between the collector of transistor T1 and output terminal A. The series connection of resistor R3, resistor R5, and diode D5 is connected between the collector of transistor T1 and ground. The series connection between resistors R3 and R5 is connected to the base of PNP transistor T3 connected in common emitter configuration. Therefore, two control voltages are applied to the base-emitter circuit of transistor T3. The first control voltage depends upon the load circuit current, which produces a corresponding voltage drop across resistor R1. Thus, the emitter of transistor T3 is connected to the series connection between resistor R1 and the cathode of diode D1, and the emitter potential of transistor T3 is therefore dependent upon the load current. The greater the load current, the more positive the emitter of transistor T3. Thus, when the load is completely short circuited and the load current is maximum, the emitter of transistor T3 will be substantially at ground potential. When the current in the load circuit is normal, the emitter of transistor T3 will be at a negative potential.

The second control voltage is applied to the base of transistor T3. Thus, resistors R3 and R5 comprise a voltage divider, and the series connection therebetween is connected to the base of transistor T3. Therefore, the potential of the base of transistor T3 is dependent upon the load circuit voltage between output terminals A and ground.

Under normal load conditions, a predetermined negative potential is thus applied to the base of transistor T3. However, the potential at the emitter of transistor T3 under normal load conditions is sufficiently negative with respect to the base, that conduction of transistor T3 is prevented, and it is thereby blocked. If the load is short circuited, the potential at the emitter of transistor T3 will be clamped substantially to ground potential, and the base of transistor T3 will be negative with respect to the emitter (although the base may be less negative relative to normal load conditions). The potential between the base and emitter of transistor T3 determines conduction, and when the base is negative with respect to the emitter, and the transistor is forward biased, it will conduct. Further, the emitter potential will vary with the short circuit load current, and therefore the conductivity of transistor T3 is dependent upon the overload conditions produced by the particular short circuit.

The conduction of transistor T3 will therefore depend upon the bias potentials applied between its emitter and base, and its emitter and collector, in response to the particular short circuit condition in the load circuit.

The bias potential applied between the emitter and base of transistor switch T1 is, as described above, dependent upon the amount by which winding W3 loads winding W1, and consequently attentuates the amplitude of the voltage produced in winding W2. Therefore, the circuit parameters are selected such that when a short circuit occurs in the load circuit, transistor T3 is correspondingly biased to conduct to a degree wherein the amplitude of the voltage induced in winding W1 is attenuated and transistor switch T1 is biased to feed a decreased current to the load that is at a safe amplitude at which damage to transistor T1 does not occur. That is, transistor T3 functions as a supervision transistor to attenuate the amplitude signals of the output of oscillator SP1, and consequently of the corresponding voltage induced in the base-emitter bias circuit of transistor T1, depending upon the particular short circuit conditions existing in the load circuit. Thus, if the load is completely short circuited, transistor switch T1 will be correspondingly biased such that it permits only a low short circuit current to flow, which is insufficient to cause damage to transistor T1 or to the load. After the load short circuit is corrected (or, if the excessive current is produced by an external voltage, applied between the modulator output terminals, and it is removed therefrom), the potential at the emitter of transistor T3 will be returned to its normal load value at which it blocks conduction of transistor T3. Consequently, the amplitude of the voltage produced in winding W1 will be returned to normal, and transistor T1 will be biased to provide the normal load circuit current. Therefore, when transistors T3 and T4 are used in the protective circuit for the transistor switch, the normal load current may be reinitiated automatically when the overload conditions are corrected.

Capacitor C4 is connected in series with diode D5 between the negative potential terminal (−U) and ground, and prevents conduction of transistor T3 when a capacitive load is connected between the modulator output terminals. Thus, capacitor C4 charges as shown in FIG. 2 when the capacitive load is charging, and an excessive load current is correspondingly produced, but conduction of transistor T3 is blocked because capacitor C4 applies a positive potential to its base and thereby biases transistor T3 to the non-conducting state. However, if a short circuit in the capacitive load occurs, the emitter of transistor T3 is responsive to the increased current flow in the load circuit, to clamp the emitter of transistor T3 to ground, and thereby bias transistor T3 to the conducting state. The capacitive load can discharge without effecting conduction of transistor T3, and during the next input puse thereto can quickly recharge because transistor T3 is again blocked by the potential applied to its base by blocking capacitor C4. Thus, capacitor C4 provides a safety feature in that transistor T3 is responsive to a short circuit in the capacitive load, but it is not responsive to the normal charge and discharge cycle thereof.

Diode D7 is connected between the emitter and base of transistor T3, and limits the amplitude of the blocking potential that may be applied therebetween. Diode D3 is connected between output terminal A and the collector of transistor T1, and compensates for the operating threshold voltage of base-emitter diode D7 and also compensates for temperature variations in transistor T3. Diode D1 is also connected between output terminal A and the collector of transistor T1, and blocks voltage peaks externally produced at the modulator output terminals from the collector of transistor T1 to prevent reverse conduction thereof. Diode D1 may also be connected in parallel with transistor T1 to bypass said voltage peaks, and the latter described parallel connection may also be utilized in conjunction with the circuit illustrated in FIG. 1.

Transistor switch T2 and its associated safety device comprising transistor T4 is used in conjunction with oscillator SP2. It comprises a circuit that functions similarly as that described with relation to transistor switch T1 and transistor T3, with appropriate modifications being made since transistor switch T2 applies positive pulses to the modulator output terminals.

Therefore, it is seen that the invention described in FIGS. 1 and 2 provides a fast-acting electronic safety device that is responsive to overload conditions in the modulator output circuit to disconnect the modulator output circuit from its source of input signals or alternatively, to reduce the current flow in the load circuit to an amount wherein the associated transistor switch is not damaged. Further, circuit means are provided to automatically initiate reconnection of the load to its source of input signals, or return the load current to its normal value, when the overload conditions are corrected.

I claim:

1. A circuit arrangement for the protection of a load circuit, the arrangement having a first electronic switch operated by a control voltage to switch a voltage source (−U) through to the load circuit, the arrangement further having a circuit connected between the voltage source and the load responsive in case of overload of the first electronic switch over a second electronic switch (TY1) to act on the control circuit of the first electronic switch and cause the control signal to control an oscillator (SP1) to produce over a first winding (W2) of a transmitter (UI) an alternating voltage, the alternating voltage after rectification (D6, C7) being applied to alternately control the first electronic switch into the conductive and the blocked state comprising:

resistance means having low resistance (R1) connected between the first electronic switch (T1) and the load circuit, the voltage drop thereacross being applied to the control input of the second electronic switch (TY1), rectifier means (D1, C1) connected in parallel to the switching path of the second electronic switch (TY1) to rectify the alternating voltage produced by the oscillator over a second winding (W3), a delay network (C2, R3) connected in parallel with the resistor means (R1) that effects a very short time delay, the output of the delay network thereby connected to control the second electronic switch (TY1), a capacitive voltage divider (C2, C4) connected parallel to the output of the arrangement (A) through the resistor means (R1) and the delay network (C2, R3) to connect capacitive means (C2) in parallel with the control path of the second electronic switch (TY1).

2. A circuit arrangement as recited in claim 1 further comprising:

a second such circuit arrangement, the first electronic switch (T2) of the second circuit arrangement operating to switch an opposite polarity voltage source (+U) through to the load circuit, the oscillators of the two circuit arrangements (SP1, SP2) having low pass filters connected to prevent overlapping.

References Cited

UNITED STATES PATENTS

| | | | |
|---|---|---|---|
| 2,999,170 | 9/1961 | Tyler | 307—254 |
| 3,192,441 | 6/1965 | Wright. | |
| 3,274,446 | 9/1966 | Nagata | 317—33 |

J D MILLER, Primary Examiner

H. FENDELMAN, Assistant Examiner

U.S. Cl. X.R.

317—31; 323—9; 331—112, 49